United States Patent
Giordano

(10) Patent No.: US 8,689,626 B2
(45) Date of Patent: Apr. 8, 2014

(54) PRESSURE SENSOR FOR AN ELECTRIC HOUSEHOLD APPLIANCE AND ASSOCIATED METHOD

(75) Inventor: Sergio Giordano, Caselle Torinese (IT)

(73) Assignee: ITW Metalflex, Tolmin (SI)

( * ) Notice: Subject to any disclaimer, the term of this patent is extended or adjusted under 35 U.S.C. 154(b) by 615 days.

(21) Appl. No.: 12/864,532

(22) PCT Filed: Feb. 6, 2009

(86) PCT No.: PCT/IB2009/000222
§ 371 (c)(1),
(2), (4) Date: Jul. 26, 2010

(87) PCT Pub. No.: WO2009/098587
PCT Pub. Date: Aug. 13, 2009

(65) Prior Publication Data
US 2010/0307236 A1    Dec. 9, 2010

(30) Foreign Application Priority Data
Feb. 8, 2008    (IT) .............................. TO2008A0103

(51) Int. Cl.
*G01F 23/00*    (2006.01)

(52) U.S. Cl.
USPC ........................................................ 73/299

(58) Field of Classification Search
USPC ........................................................ 73/299
See application file for complete search history.

(56) References Cited

U.S. PATENT DOCUMENTS

| | | |
|---|---|---|
| 4,858,615 A | 8/1989 | Meinema |
| 5,051,937 A | 9/1991 | Kawate et al. |
| 7,180,285 B2 | 2/2007 | Bindocci et al. |
| 7,258,016 B2 | 8/2007 | Maitland, Jr. et al. |
| 7,313,966 B2 | 1/2008 | Arnold et al. |

FOREIGN PATENT DOCUMENTS

| | | |
|---|---|---|
| CN | 101084422 A | 12/2007 |
| EP | 1072968 A2 | 1/2001 |
| EP | 1825241 | 8/2007 |
| IT | TO20020245 A1 | 9/2003 |
| WO | 2006065535 | 6/2006 |
| WO | 2007034294 A | 3/2007 |

OTHER PUBLICATIONS

International Search Report for PCT/IB2009/000222 dated May 26, 2009.

*Primary Examiner* — Hezron E Williams
*Assistant Examiner* — Rodney T Frank
(74) *Attorney, Agent, or Firm* — Lowe Hauptam & Ham LLP

(57) ABSTRACT

A pressure sensor including a body, device for receiving pressure associable with a tube connected to a fluid-filled tank of an electric household appliance, wherein the level of the fluid is to be measured. It further includes a device for emitting electric frequency signal proportional to the pressure received; a device carried aboard the body, on which a plurality of response frequency values emitted by the emitting means associated with corresponding pressure values at the pressure receiving means, were recorded. The pressure sensor is used with a pressure reading system carried by the device for receiving pressure. The pressure reading system includes two devices for reading values recorded on the pressure sensor, i.e. pressure and frequency values; and electric frequency signals. The pressure reading system further includes a processing device for interpolating the pressure value associated with every signal on the basis of the values read by the reading device.

12 Claims, 2 Drawing Sheets

PRESSURE SENSOR FOR AN ELECTRIC HOUSEHOLD APPLIANCE AND ASSOCIATED METHOD

RELATED APPLICATIONS

The present application is national phase of International Application Number PCT/IB2009/000222, filed Feb. 6, 2009, and claims priority from, Italian Application Number TO2008A000103, filed Feb. 8, 2008, the disclosures of which are hereby incorporated by reference herein in their entirety.

TECHNICAL FIELD

The present invention relates to a pressure sensor connectable in use to a sump or water collection tank of an electric household appliance, specifically a dishwasher or a washing machine, for detecting the water level in the tank or sump. The invention further relates to an associated method for calibrating the sensor and accurately measuring the pressure applied to the sensor in use.

BACKGROUND ART

An electrodynamic transducer is known from Italian patent application No. 2002A000245, which may be used as pressure sensor in an electric household appliance and which comprises a rigid body accommodating a deformable membrane therein, which is sensitive to the hydraulic pressure present on one side of the same connected in use, for example, to a tank of an electric household appliance containing a fluid, the level of which is intended to be measured; the membrane carries a ferromagnetic core operatively connected to an inductor and its movement thus produces a variation of the resonance frequency of the inductor which may be detected and processed by a specific processor, usually carried aboard the electric household appliance.

The transducers of the above-described type require to be firstly calibrated according to their transduction feature and then checked for such a feature to follow a curve which remains within predetermined tolerances, in order to limit measurement errors in use. Therefore, despite of performing a relatively long, complex step of calibrating, in any case the known analogue pressure sensors provide an inaccurate measurement, even though the inaccuracy is limited within predetermined tolerances.

In order to avoid or, at least, limit such a phenomenon, the transducer according to the aforesaid Italian patent application is provided onboard with an additional electronic circuit including a non-volatile memory unit for a series of corrective values to be applied to the values processed by the transducer, possibly provided with a microprocessor.

Similarly, U.S. Pat. No. 5,051,937 provides for fitting a complex electronic circuit provided with a sample capacitor aboard the sensor, which is able to correct the processed values on the basis of the simple frequency response of the sensor.

It is apparent that the known solutions briefly described above concerning the set forth technical problem are not satisfactory because they are complex, costly and have a large bulk.

DISCLOSURE OF INVENTION

It is an object of the present invention to solve the described drawbacks by providing a pressure sensor which is easy to be assembled, reliable to be operated, of reduced bulk and low in cost, while providing highly accurate readings.

The present invention thus relates to a pressure sensor for an electric household appliance, such as a dishwasher or a washing machine, as defined in claim 1.

The invention further relates to a system for accurately measuring the pressure, and specifically the related level of a fluid in a tank of an electric household appliance using the aforesaid sensor, as defined in claim 7.

Finally, the invention further relates to a method associated with the aforesaid sensor, specifically a method for accurately measuring a pressure, as defined in claim 9.

According to the main aspect of the invention, the sensor comprises a body, pressure receiving means associable with a tube of an electric household appliance, e.g. connected to a tank in which there is collected in use a fluid, the level of which it is intended to be measured, and means emitting an electric frequency signal proportional to the pressure received by the receiving means; and further comprises readable storing means carried aboard the body, integrally therewith, on which before using the sensor in the electric household appliance, a plurality of values of response frequencies emitted by the emitting means were recorded, each value associated with a corresponding pressure value which is present each time at the pressure receiving means and is known beforehand.

According to the preferred embodiment, the readable storing means comprise at least one label externally fixed to the body and bearing either engraved or printed, on an exposed face thereof, a one- or two-dimensional barcode, reproducing the mentioned pressure and frequency response values associated therewith.

In use, the sensor is associated with a pressure reading system to which the aforesaid sensor belongs and further carried by the electric household appliance including first means for reading the pressure and frequency values recorded on the readable storing means, second means for reading the electric frequency signal present at the emitting means, and processing means for interpolating the pressure value associated with the signal read each time by the second reading means on the basis of the values read by the first reading means.

In this manner, instead of performing a complete calibration of the sensor and then having in use an inaccurate pressure reading in any case, even though within a maximum allowable tolerance, checked during the calibration, only the zero point needs to be calibrated and it is then sufficient the detection, e.g. by means of an appropriate testing station, of the corresponding frequency response values emitted by the sensor and characteristic of that particular sensor only, for a discreet number of known pressure values, which are applied to the sensor, and then quoting such pairs of pressure and corresponding frequency response values, e.g. in the form of a barcode printed on a label which is then applied outside the sensor body.

Instead of providing a sensor with a frequency response curve which is ensured within a predetermined tolerance curve range, the sensor is essentially provided along with its characteristic frequency response curve. Therefore, this could even be out of the allowable tolerances, without having any consequences on the reading accuracy ensured by the sensor.

The label is indeed read in use by an optical sensor placed on the electric household appliance and connected to an electronic control unit which should be however present to process the frequency signals emitted by the pressure sensor; accordingly, the control unit is programmed so as to take into account both these values read by the optical sensor and the values received by the sensor in use, and so as to calculate the pressure values actually present at the sensor by interpolating them on the basis of the received data, i.e. on the basis of both the pressure sensor readings and the optical sensor reading.

According to a different embodiment, alternatively or additionally to the label, the same pressure and frequency response data may be stored in a simple chip, e.g. in a FLASH memory, and the electric household appliance will be equipped with means for reading such a memory instead of with the optical sensor.

BRIEF DESCRIPTION OF THE DRAWINGS

Further features and advantages of the present invention will be apparent from the following description of a non-limitative embodiment thereof, with reference to the figures in the accompanying drawings, in which.

BEST MODE FOR CARRYING OUT THE INVENTION

Figure 1:
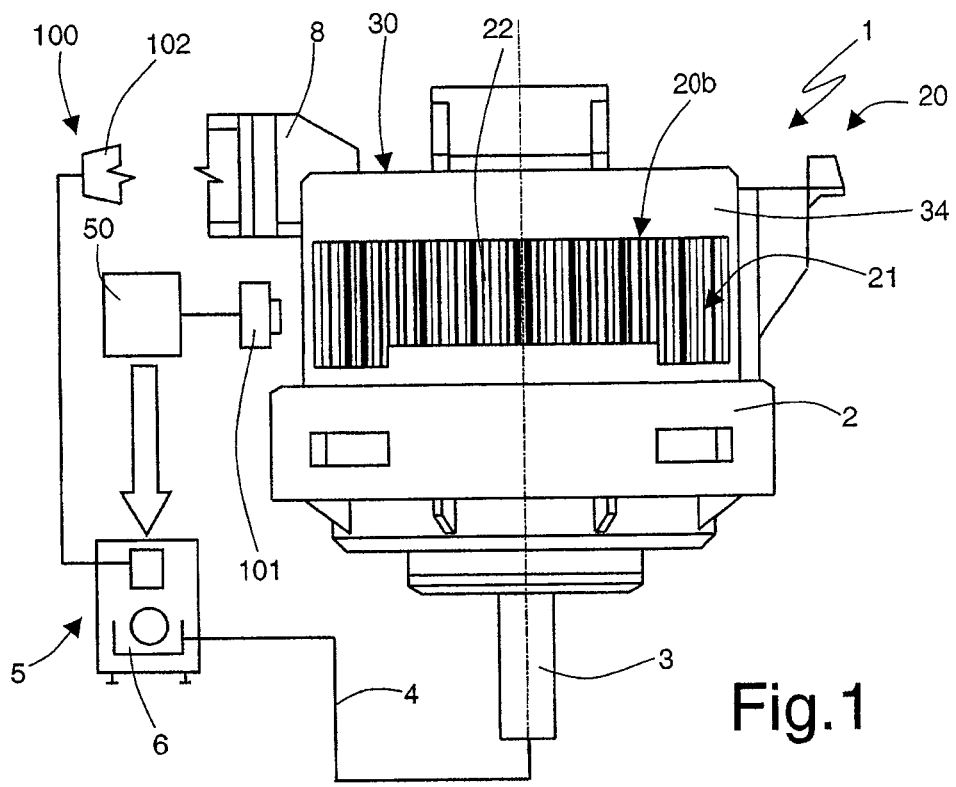
FIG. 1 shows an elevation view of a pressure sensor according to the invention and a sketch of a first embodiment of the pressure measuring system according to the invention.

With reference to figures from 1 to 3, numeral 1 indicates as a whole a pressure sensor comprising a body 2, means 3 for receiving a pressure to be measured, consisting of a nipple carried by the body 2 and associable in use with a tube 4 of an electric household appliance 5, in this case a washing machine, e.g. connected to a tank 6 in which a service fluid of the electric household appliance 5 is collected, the level of which is intended to be measured, and means 8 emitting an electric frequency signal proportional to the pressure received by the receiving means 3, in this case consisting of a plug integrally carried by the body 2.

The sensor 1 is an analogue sensor; therefore, a membrane is accommodated in a known manner and therefore not shown for simplicity inside the body 2, which membrane is exposed to the pressure present at the means 3 and associated with electromagnetic means (also known and not shown for simplicity) connected to the plug 8 and which make a corresponding frequency electric signal, proportional to the pressure present at the receiving means 3, reach the same.

According to the invention, the sensor 1 heretofore described and known per se, further comprises readable storing means 20 carried aboard the body 2, integrally therewith, on which before coupling the sensor 1 to the electric household appliance 5, a plurality of values of response frequencies were recorded, which were emitted by the emitting means 8 associated with corresponding pressure values which were present each time at the pressure receiving means 3.

The readable storing means 20 comprise at least one label 20b or 20c externally fixed to the body 2 and bearing either engraved or printed, on an exposed face 21 thereof, a one-(label 20b) or two-dimensional (label 20c) barcode, reproducing the pressure and frequency response values associated therewith previously applied to the means 3 and detected at the means 8.

According to the preferred embodiment, the same sensor 1 carries two labels externally applied to the body 2, i.e. both label 20b and label 20c, which are externally fixed to the body 2 and both bearing either engraved or printed, on an exposed face 21 thereof, a barcode (22 and 23, respectively) reproducing a discreet number of identical pressure values and frequency responses associated therebetween.

The label 20b bears the barcode 22 in the one-dimensional form, while the label 20c is fixed to a different part of the body 2 far from the one carrying the first label 20b, and bears the barcode 23 in the two-dimensional form. Specifically, the body 2 has a substantially cylindrical shape, the second label 20c is carried by a flat upper end face 30 of the body 2 and the first label 20b is carried by a cylindrical side surface 34 of the body 2.

According to the illustrated embodiment, the readable storing means 20 further comprise at least one memory chip 40, e.g. a FLASH memory, fixed aboard the body 2, either externally or internally thereto; in the case shown, the chip 40 is externally carried by the body 2 and bears a barcode 22 impressed thereon, the barcode bearing the same information as the code of the label 20b.

The means 20 further comprise, in addition to the memory 40, interface means 41, again carried aboard by the body 2 (e.g. integrated into the plug 8), to connect in use the memory chip 40 to an electronic control unit 50 which is outside the body 2 and independent thereof, in this case belonging to the electric household appliance 5.

The described sensor 1 belongs in use to a pressure reading system 100 (FIG. 1) or 200 (FIG. 2), specifically for detecting the level of a fluid in the tank 6 (FIG. 1) of an electric household appliance 5 (FIGS. 1 and 2); the system 100 comprises, in addition to the sensor 1: first means 101 for reading the pressure and frequency values recorded on the readable storing means 20, in this case consisting of a sensor/optical barcode reader known per se; second means 102 for reading the electric frequency signal present at the emitting means 8, consisting of a multi-pole connector which may be inserted into the plug 8, and processing means 50 consisting of a control unit, e.g. a microprocessor for interpolating the pressure value associated with the signal read each time by the second reading means 102 on the basis of the values read by the first reading means 101.

Figure 2:
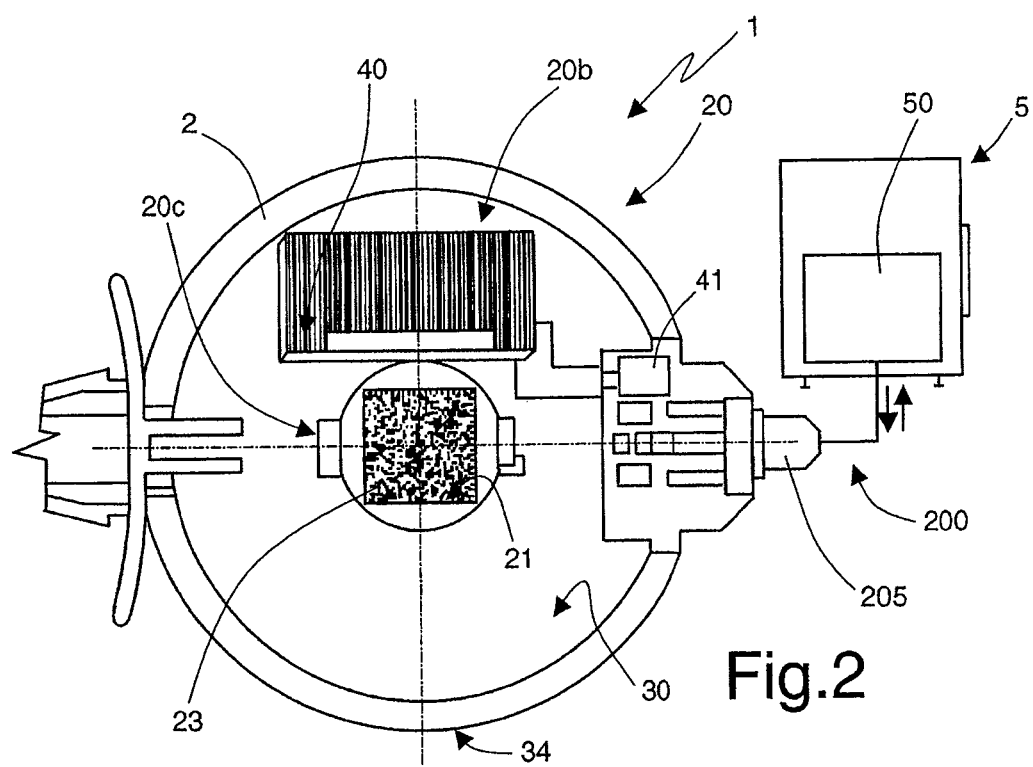
FIG. 2 shows a top plan view of the sensor in FIG. 1 and of a sketch of a second embodiment of the pressure measuring system according to the invention.

In the case of the system 200 in FIG. 2, the first and second reading means are integrated in a single multi-pole connector 205 connected to the plug 8, which is also made in the form of a multi-pole connector and integrates the interface means 41 thus making both the values stored in the chip 40 and the current values generated by the sensor 1 upon a pressure present at the receiving means 3, available for the plug 8 and accordingly for the connector 205. The connector 205 is in turn connected to a microprocessor control unit 50 of the electric household appliance 5.

According to both embodiments 100 and 200, the first and second reading means (101 and 102 or 205) and the processing means 50 are permanently associated with the electric household appliance 5, while the pressure sensor 1 is removably associated with the electric household appliance and connected in use to the tank 6 by means of the tube 4 associated with the pressure receiving means 3.

Figure 3:
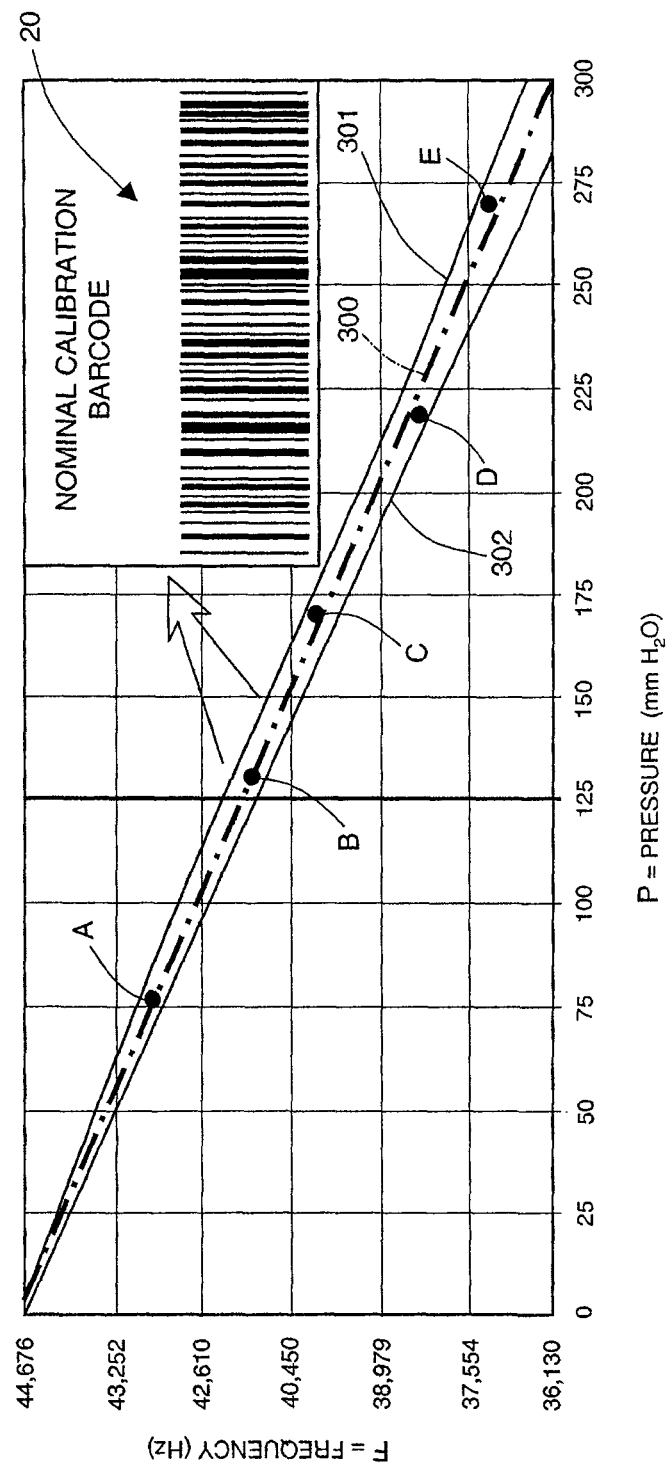
FIG. 3 shows a graph showing frequency response curves in response to applied pressures of the sensor in FIG. 1, shown by the side of a barcode reproducing the same data depicted in one of the illustrated curves.

With reference to FIG. 3, a method for performing accurate pressure readings, specifically for detecting the level of a fluid in the tank 6 of the electric household appliance 5, is implemented by means of analogue sensor 1 and system 100 or 200 for measuring the pressure; such a method comprises the following steps.

Applying a plurality of known pressure values P (e.g. at a calibration station, not shown) to the sensor 1, at the receiving means 3, and measuring a frequency response value F of the sensor 1 for each pressure value applied; a graph of the type shown by the dashed curve 300 in FIG. 3 is thus plotted by discreet points A, B, C, D, E, which generally but not necessarily will be comprised between two curves 301 and 302, which represent the tolerance limit curves of a normal analogue sensor of the type of sensor 1.

All the applied pressure values P and for each of them the corresponding measured frequency response value F, i.e. the data by means of which the curve 301 is constructed, are recorded on readable storing means 20, in the form of barcode; the label 20 shown in FIG. 3 and the graph 301 thus represent the same information.

The readable storing means 20 are then fixed aboard the sensor 1, specifically on the body 2 thereof and then in use, i.e. once the sensor 1 has been assembled in the electric household appliance 5, thus forming a system 100 or 200, the pressure to be measured is applied to the sensor 1 by means of the tube 4, and the frequency response values F generated by the sensor are detected by means of the plug 8 and the connector 102 (or 205).

At the same time, the discreet pressure values P of frequency response F previously recorded on the readable storing means 20 are also read, and for each detected frequency response value, the corresponding pressure value present at the receiving means 3 is calculated (by means of the control unit 50) by interpolating it on the basis of the previously recorded pressure and corresponding frequency response values of the sensor 1 which are stored on the means 20.

In this manner there is essentially no need to calibrate the sensor 1 on its entire characteristic curve nor to check the respect of the tolerances allowed by the same, even if absolutely accurate and reliable readings are obtained.

The invention claimed is:

1. A pressure reading system, specifically for detecting the level of a fluid in a tank of an electric household appliance, comprising a pressure sensor comprising a body, pressure receiving means associable with a tube of an electric household appliance, the level of which is intended to be measured, and means emitting an electric frequency signal proportional to the pressure received by the receiving means; characterized in that it further comprises readable storing means carried aboard the body, integrally therewith, on which there were recorded a plurality of response frequency values emitted by the emitting means associated with corresponding pressure values which were present each time at the pressure receiving means, the pressure reading system further comprising first reading means of pressure and frequency values recorded on the readable storing means, second reading means of the electric frequency signal present at the emitting means, and processing means for interpolating the pressure value associated with the signal read each time by the second reading means on the basis of the values read by the first reading means.

2. A pressure reading system according to claim 1, characterized in that said readable storing means comprise at least one label externally fixed onto the body and bearing either engraved or printed, on an exposed face thereof, a one- or two-dimensional barcode, reproducing said pressure values and said frequency response values associated therewith.

3. A pressure reading system according to claim 2, characterized in that said readable storing means comprise two labels externally fixed onto the body and both bearing either engraved or printed, on an exposed face thereof, a barcode reproducing said pressure values and said frequency response values associated therewith; a first of said labels bearing said barcode in the one-dimensional form and a second label, fixed to a different part of said body and far from the one carrying the first label, bearing said barcode in the two-dimensional form.

4. A pressure reading system according to claim 3, characterized in that said body is essentially cylinder-shaped, said second label being carried by a flat upper end face of the body and said first label being carried by a cylindrical side surface of the body.

5. A pressure reading system according to claim 1, characterized in that said readable storing means comprise at least one memory chip, e.g. a FLASH memory, fixed aboard the body, either externally or internally to the same; and interface means, again carried aboard said body, for connecting said memory chip to an electronic control unit outside the body and independent thereof.

6. A pressure reading system according to claim 1, characterized in that said first and second reading means and said processing means are permanently associated with said electric household appliance, while said pressure sensor is removably associated with said electric household appliance and is connected in use to said tank by means of a tube associated with said pressure receiving means.

7. A household appliance, comprising:
a tank, wherein the household appliance is configured to collect fluid in the tank; and
the pressure reading system of claim 1, wherein the pressure sensor is in fluid communication with the tube, wherein the tube is in fluid communication with the tank.

8. A pressure reading system, specifically for detecting the level of a fluid in a tank of an electric household appliance, comprising a pressure sensor comprising a body, pressure receiving means associable with a tube of an electric household appliance, and means emitting an electric frequency signal proportional to the pressure received by the receiving means; characterized in that it further comprises readable storing means carried aboard the body, integrally therewith, on which there were recorded a plurality of response frequency values emitted by the emitting means associated with corresponding pressure values which were present each time at the pressure receiving means, the pressure reading system further comprising first reading means of pressure and frequency values recorded on the readable storing means, second reading means of the electric frequency signal present at the emitting means, and processing means for interpolating the pressure value associated with the signal read each time by the second reading means on the basis of the values read by the first reading means.

9. A pressure reading system according to claim 8, characterized in that said readable storing means comprise at least one label externally fixed onto the body and bearing either engraved or printed, on an exposed face thereof, a one- or two-dimensional barcode, reproducing said pressure values and said frequency response values associated therewith.

10. A pressure reading system according to claim 9, characterized in that said body is essentially cylinder-shaped, said second label being carried by a flat upper end face of the body and said first label being carried by a cylindrical side surface of the body.

11. A pressure reading system according to claim 8, characterized in that said readable storing means comprise at least one memory chip, e.g. a FLASH memory, fixed aboard the body, either externally or internally to the same; and interface means, again carried aboard said body, for connecting said memory chip to an electronic control unit outside the body and independent thereof.

12. A household appliance, comprising:
a tank, wherein the household appliance is configured to collect fluid in the tank; and
the pressure reading system of claim 8, wherein the pressure sensor is in fluid communication with the tube, wherein the tube is in fluid communication with the tank.

\* \* \* \* \*